(No Model.)
H. G. BRAKENSIEK.
TRACK CLEANER.
No. 458,215. Patented Aug. 25, 1891.
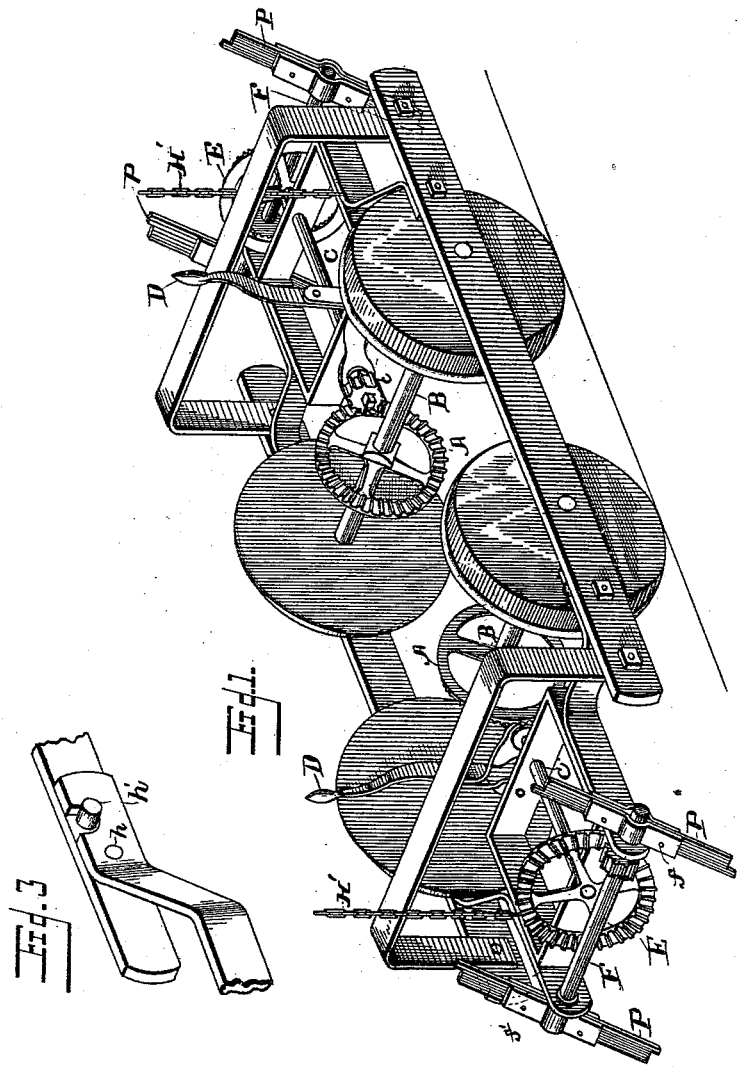
Witnesses
J. M. Fowler
Alex. J. Stewart
Inventor
Henry G. Brakensiek
by Church & Church
his Attorneys (No Model.) 2 Sheets—Sheet 2.
H. G. BRAKENSIEK.
TRACK CLEANER.
No. 458,215. Patented Aug. 25, 1891.
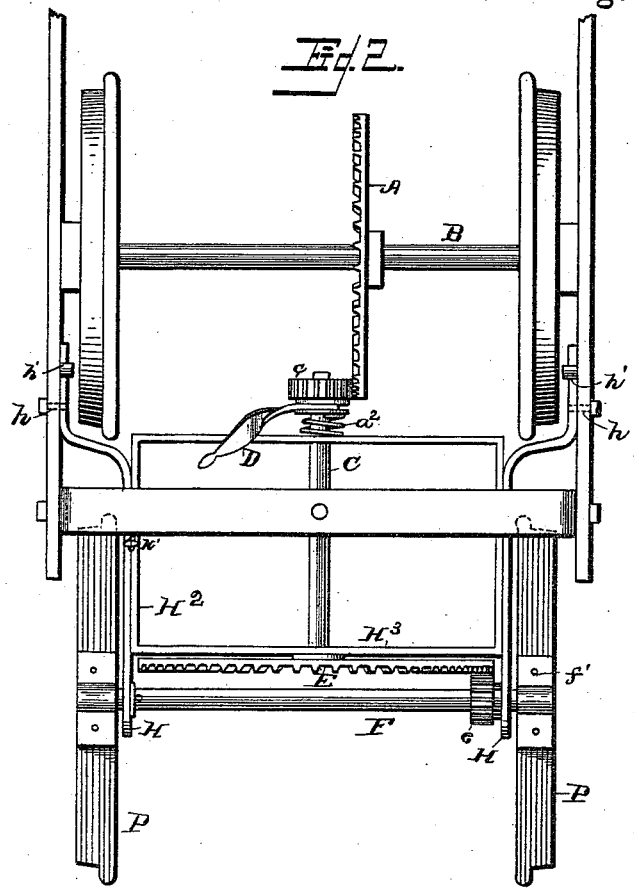
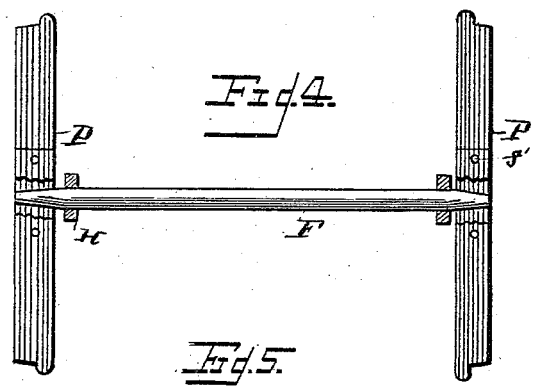
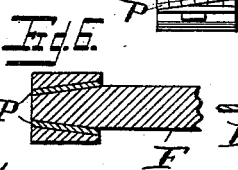
Witnesses
J. M. Fowler Jr.
Alex J. Stewart.
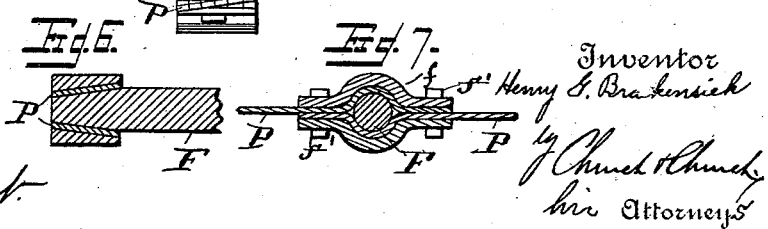
Inventor
Henry G. Brakensiek
by Church & Church
his Attorneys

UNITED STATES PATENT OFFICE.

HENRY G. BRAKENSIEK, OF ELLINGTON, ILLINOIS.

TRACK-CLEANER.

SPECIFICATION forming part of Letters Patent No. 458,215, dated August 25, 1891.

Application filed April 20, 1891. Serial No. 389,610. (No model.)

*To all whom it may concern:*

Be it known that I, HENRY G. BRAKENSIEK, of Ellington township, in the county of Adams and State of Illinois, have invented certain new and useful Improvements in Track-Cleaners; and I do hereby declare the following to be a full, clear, and exact description of the same, reference being had to the accompanying drawings, forming a part of this specification, and to the letters of reference marked thereon.

This invention relates to improvements in devices for cleaning the tracks immediately in front of the trucks of a car, being for this purpose adapted to be carried by said trucks and attached directly to the truck or car-frame, the object being to provide a simple and powerful cleaner, not liable to get out of order or be injured by rough usage, and which will not in the least impair the running of the truck in turning curves, starting, or by reason of sudden changes in the grade, such results being especially important and desirable where the cleaner is applied to cars having electric or similar self-contained motor mechanism acting through the traction of the wheels.

The invention further consists in certain novel details of construction and combinations and arrangements of parts to be hereinafter described, and pointed out particularly in the claims at the end of this specification.

In the accompanying drawings, Figure 1 is a perspective view of a truck of an electric or similar car having my invention applied thereto, the body of the car, motor, and other mechanism being omitted for the sake of clearness. Fig. 2 is a top plan view of one end of the truck. Fig. 3 is a detail of the preferred form of connection between the truck-frame and cleaner-frame. Fig. 4 is a sectional view of one end of the sweeper-shaft of the cleaner. Fig. 5 is a view looking at the end of one of the sweepers. Figs. 6 and 7 are detail sectional views through one end of the sweeper or transverse shaft.

Similar letters of reference in the several figures indicate the same parts.

My invention is particularly designed for use in connection with electric cars, in which, as is well known, the motor and connected parts occupy a large proportion of the available space between the wheels and adjacent the axles. Hence it is desirable that the connection between the cleaners and axle through which motion is transmitted should occupy as little space as possible.

In carrying the invention into practice a relatively thin cog-wheel A is applied to the axles B at front and rear of the truck, with which gear-wheel meshes a pinion $c$, sliding upon the rear end of a shaft C. This small sliding gear is mounted upon the squared end of the shaft C or is connected thereto by a spline and groove and constitutes a clutch adapted to be thrown into or out of gear by the shifting-lever D, suitably pivoted to its support and passing up into the car beneath the seats at one end. On the forward end of the shaft C is mounted a large gear-wheel E, having its gear-teeth upon the front, or, if desired, provided with beveled teeth, adapted to mesh with the gear-pinion $e$, rigidly mounted on the transverse shaft F, which latter carries at each end the revolving sweepers P.

The shafts C and F and their connected parts are journaled in a frame-work H, termed herein the "cleaner-frame," which is independent of but pivotally connected to the truck-framing.

In the preferred construction the cleaner-frame is connected to the truck-frame by pivots $h$, located well in toward the journal of the axle, and while it has a free upward movement on said pivots it is held against downward movement by the stops $h'$ on the front frame, the cleaner-frame being adapted to remain substantially horizontal or in line with the truck-frame under ordinary conditions, but is readily lifted to elevate the sweepers from the track by means of a chain H' or similar device, or to automatically rise in turning a curve or when a sudden change of grade is encountered, thereby saving much wear and tear on the sweepers and preventing the stalling of the car.

In constructing the cleaner-frame care is taken that it shall be as simple as possible, while at the same time it shall be of maximum strength, and for this purpose two side pieces $H^2$ are employed, the inwardly-extending ends of which have the pivots therein, and the outwardly-extending ends of which carry the bearings for the transverse shaft E, said side piece being connected rigidly by means of a rectangular framing H³, having the bearings for the shaft C.

The sweepers in the preferred form consist of a series of narrow, flat, and elastic steel strips P, which are clamped tightly to the transfer-shaft and are long enough to just sweep the surface of the rails, the strips at the inside of each sweeper being somewhat longer than the others, as shown, and adapted to enter grooves in the rail to keep out any accumulation of dirt therein to prevent the jumping of the wheel, and what is of equally great importance, to prevent the breaking of the electrical contact between the wheels and rails.

In operation the cleaner preceding the trucks is the only one in engagement, and the sweepers are rotated in a direction to throw the dirt or snow forward; but were the same simply thrown forward it would fall upon the tracks again, and to overcome this difficulty each of the sweepers is given an inclination, as shown in Fig. 5, tending to throw the snow outward, as well as forward, beyond the car-steps. To secure this the ends of the transverse shaft are made conical or wedge-shaped, and the sweepers, when clamped thereto by means of clamps and bolts $f'$, will incline outward, as shown, doing away with the necessity of "forming up" separately each of the sweepers, enabling the same to be applied or adjusted by ordinary helpers. The gear $c$ is preferably held in engagement with the gear A by means of a spring $a^2$. Thus the sweepers are caused to rotate even when the cleaner-frame is elevated either purposely or in turning a curve, as before mentioned, this elevation not being sufficient, however, to throw the gears out of operative connection. In each instance it will be noted that the portions of the sweepers which normally enter the grooves in the rail will ride out of the groove and elevate the frame.

The cleaner, it will be noted, can be applied to any of the cars now in use without altering the same in the least, as the space occupied by the gear connected to the axle is very small, and the remaining portion of the device is so shaped as not to interfere with any of the existing truck connections.

Having thus described my invention, what I claim as new is—

1. In a track-cleaner, the combination, with the truck-framing, the cleaner-frame pivotally connected thereto, the rotary sweepers mounted on the transverse shaft journaled in the sweeper-frame, the longitudinal shaft journaled in the sweeper-frame, with gear connections between said shafts, and the gear mounted on the truck-axle, of the shifting-gear mounted on the end of the longitudinal shaft and adapted to engage the gear on the truck-axle, and the shifter for moving said gear, substantially as described.

2. In a track-cleaner, the combination, with the truck-framing, the cleaner-frame pivotally connected thereto, the rotary sweepers mounted on the transverse shaft journaled in the sweeper-frame, the longitudinal shaft journaled in the sweeper-frame, with gear connections between said shafts, and the gear mounted on the truck-axle, of the spring-pressed shifting-gear mounted on the end of the longitudinal shaft and adapted to engage the gear on the truck-axle, and the shifter for moving said gear, substantially as described.

3. In a track-cleaner, the combination, with the truck-frame, of the cleaner-frame having the rearward and forward extensions, having bearings therein for the pivots of the cleaner-frame, and transverse shaft carrying the sweepers, respectively, and the central rectangular portion uniting said side pieces and having the journals therein for the longitudinal shaft interposed in the gearing between the transverse shaft and truck-axles, substantially as described.

4. In a track-cleaner, the combination, with the truck-frame and the cleaner-frame pivotally connected thereto, of the sweepers driven from the truck-axle journaled in the cleaner-frame and having the extended end adapted to pass into the grooves of the rail, whereby said frame is elevated in turning a curve, substantially as described.

5. In a track-cleaner, the combination, with the truck-frame and the transverse shaft driven from the truck-shaft and having the tapered or wedge-shaped ends, of the thin elastic strips clamped to said ends and constituting sweeper-blades inclined to discharge the sweepings to one side, substantially as described.

6. In a track-cleaner, the combination, with the truck-frame and the transverse shaft, of the sweepers consisting of the radially-disposed thin, narrow, and elastic steel strips clamped tightly at their ends to the transverse shaft, substantially as described.

HENRY G. BRAKENSIEK.

Witnesses:
L. E. EMMONS,
L. E. EMMONS, Jr.